United States Patent [19]
Nakajima

[11] Patent Number: 5,309,438
[45] Date of Patent: May 3, 1994

[54] ATM CELL DELAY CIRCUIT FOR ISDN SYSTEM

[75] Inventor: Hideki Nakajima, Tokyo, Japan

[73] Assignee: Ando Electric Co., Ltd., Tokyo, Japan

[21] Appl. No.: 100,643

[22] Filed: Jul. 30, 1993

Related U.S. Application Data

[63] Continuation-in-part of Ser. No. 865,423, Apr. 8, 1992, abandoned.

[30] Foreign Application Priority Data

Apr. 12, 1991 [JP] Japan .................................. 3-108750

[51] Int. Cl.$^5$ .......................... H04J 3/06; H04J 3/24
[52] U.S. Cl. ..................... 370/94.1; 370/102; 370/108
[58] Field of Search ................. 370/60, 94.1, 99, 102, 370/108, 110.4, 111, 112, 110.1

[56] References Cited

U.S. PATENT DOCUMENTS

| | | | |
|---|---|---|---|
| 4,353,129 | 10/1982 | Nishiwaki | 370/102 |
| 4,594,706 | 6/1986 | Kobayashi | 370/94.1 |
| 4,970,720 | 11/1990 | Esaki | 370/94.1 |
| 5,130,978 | 7/1992 | Mobasser | 370/60 |

OTHER PUBLICATIONS

Murakami, H.; Yokoi, T.; Taka, M.; "Considerations on ATM Networking Performance Planning", *IEICE Trans. Commun.*; vol. E75-B, No. 7; Jul. 1992; pp. 563-571.

Uematsu, H.; Ueda, H.; "STM Signal Transfer Techniques in ATM Networks", *IEEE Communications Society Reprint*; 1992; No. 311.6

*Primary Examiner*—Douglas W. Olms
*Assistant Examiner*—Alpus H. Hsu
*Attorney, Agent, or Firm*—Panitch, Schwarze, Jacobs & Nadel

[57] ABSTRACT

A circuit for applying delays to ATM cells in an ISDN comprises a dummy cell generating circuit for generating dummy cells at a controllable time interval, a first cell filter for extracting from an input signal only those cells to which delays are to be applied, a cell multiplexing circuit for synthesizing an output of the dummy cell generating circuit and an output of the cell filter, a delay adding circuit for delaying an output of the cell multiplexing circuit, and a second cell filter for eliminating the dummy cells from the output of the delay adding circuit. In case the dummy cell generating circuit is arranged to generate idle cells, the second cell filter is omitted. By multiplexing the signal cells inputted to the delay adding circuit with the dummy cells, the time taken for the input cells to pass through a shift register constituting the delay adding circuit can be controlled.

2 Claims, 5 Drawing Sheets

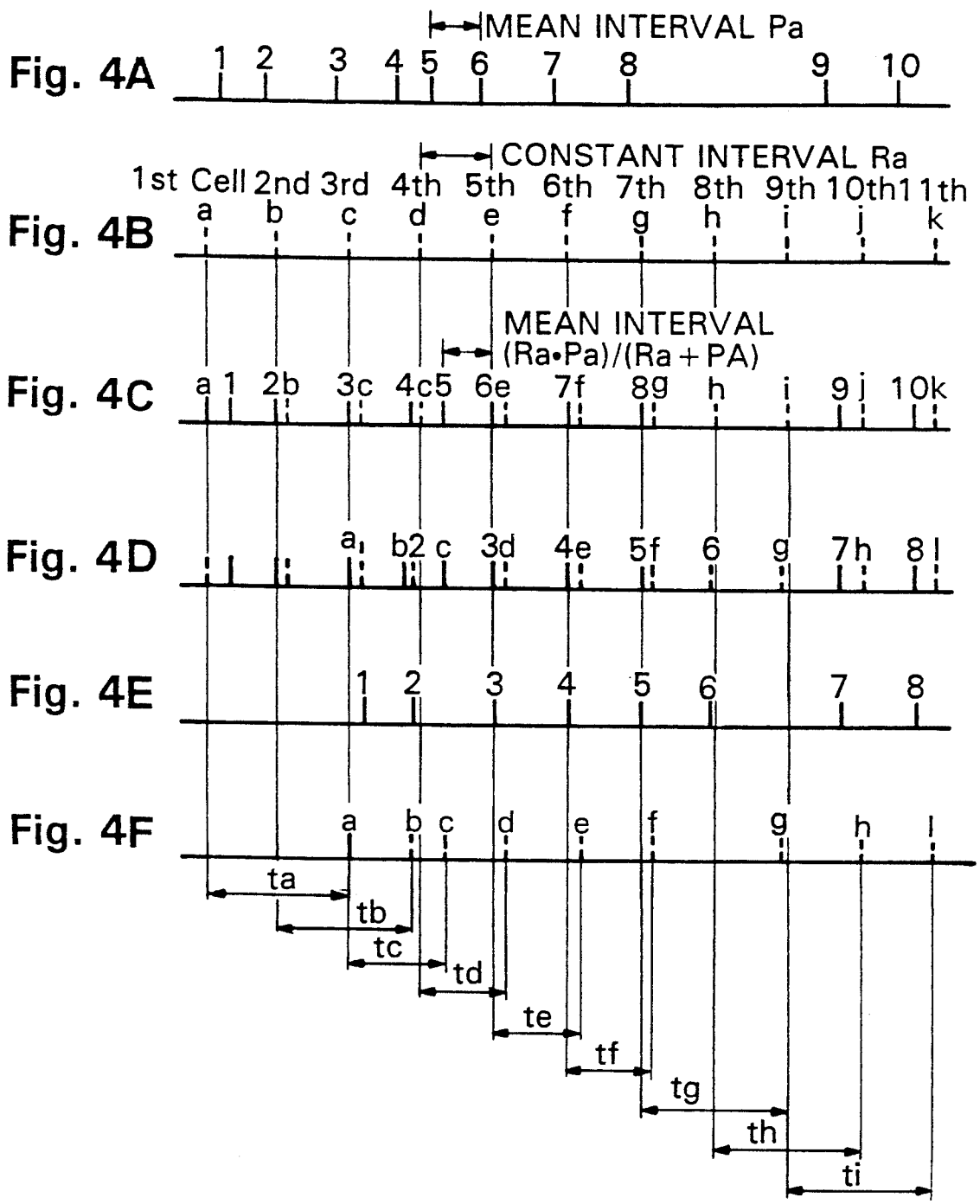

5,309,438

ATM CELL DELAY CIRCUIT FOR ISDN SYSTEM

This application is a continuation-in-part of application Ser. No. 07/865,423, filed Apr. 8, 1992, now abandoned.

BACKGROUND OF THE INVENTION

1. Field of the Invention

The present invention generally relates to a tester for evaluating influence given to a terminal unit by variations in propagation delay time of information cells transmitted through a high-speed wide-band ISDN (Integrated Services Digital Network) system, and more particularly to an ATM cell delaying circuit for giving variable delays to the ATM cells.

The ATM (Asynchronous Transfer Mode) transmission technique is considered a promising means in implementing a transmission network of the high-speed wide-band ISDN system. With the ATM transmission, a variety of information or data are divided into blocks known as cells in the art, each of which has a fixed length and is affixed with a header, wherein transmission efficiency is improved through statistical multiplexing of these cells. Consequently, the propagation delay time of the cells on the network tends to vary in dependence on the amount of traffic. (H. Murakami et al., Considerations on ATM Network Performance Planning, *IEICE Trans. Commun.*, Vol. E75-B, No. 7, July, 1992, hereby incorporated by reference.) Accordingly, means for correcting the variation in the propagating delay time must be incorporated in the terminal unit of the high-speed wide-band ISDN system. (H. Uematsu et al., STM *Signal Transfer Technique in ATM Network*, Conference Proceedings of IEEE International Conference on Communications, Jun. 14–18, 1992, Chicago, Ill., hereby incorporated by reference.) The nature of the ATM network with respect to such variation in delay must be known. Such nature of variation can be evaluated according to the present invention by generating a cell stream which is formed by adding a given delay to a cell stream which has no variation in delay, which is then passed through the ATM 1network for evaluation.

2. Description of the Prior Art

FIGS. 2A and 2B of the accompanying drawings show schematically structures of an ATM cell delay circuit known heretofore. In the case of the circuit configuration shown in FIG. 2A, a delay adding circuit 4 applies a desired amount of delay to an input signal. The delay adding circuit 4 is constituted by a multistage shift register. In general, in the ATM network, the transmission rate is selected high (e.g. 155,52M bps or more) with a view to enhancing the statistical multiplexing effect. Consequently, a shift register of a large capacity is required in order to increase the delay time to be added or applied to the input signal. Moreover, with the circuit configuration shown in FIG. 2A, it is difficult to accommodate change or vibration in the propagation delay time which is a feature characteristic of the ATM network.

FIG. 2B shows another example of the ATM cell delay circuit known heretofore. This circuit differs from that shown in FIG. 2A in that a cell filter 2 is additionally provided for extracting only the cells to which the delay is to be applied. With the arrangement shown in FIG. 2B, the delay time to be added can significantly be increased, while allowing variations in the propagation delay time. However, since the propagation delay time is closely related to cell arrival time interval, difficulty is involved in controlling the width of distribution or dispersion of the delay times.

Next, operation of the ATM delay cell delay circuits shown in FIGS. 2A and 2B will be described by reference to FIGS. 3A and 3B, in which FIG. 3A is a timing chart for illustrating a distribution of arrival times of those cells which are extracted from the input signal to be delayed, and FIG. 3B is a timing chart for illustrating operation of the delay adding circuit 4 constituted by the shift register having a number of stages corresponding to, for example, five cells. An input signal "1" shown in FIG. 3A can make appearance at the output of the shift register only after five cells have been inputted to the delay adding circuit 4 in succession to the input signal "1". Consequently, the delay times as added to the cells vary in dependence on the dispersion of the cell arrival times. In the case of the abovementioned example, the input cells are delayed by $5 \times Pa$ on an average, wherein Pa represents a mean cell arrival time interval of the input signal. When there is included a quiescent period in the communication, the quiescent period h in the output signal will be covered at least partially by the delay time as added.

In a two-way communication in which an answer is returned to an query message, communication is performed in such manners as illustrated in FIGS. 3A and 3C when the delay adding circuit shown in FIG. 2B is employed. Assuming that the cells shown at f in FIG. 3B represent information at the start of the communication, the two-way communication is so performed that only after the answer signal i shown in FIG. 3C is sent back in response to the information d shown in FIG. 3A, the succeeding information e shown in FIG. 3 is sent out. Consequently, when a delay is added to the communication, the information of the cells "6" to "10" contained in the input signal d shown in FIG. 4 can not be outputted until the input signal i is sent back when the delay adding circuit 4 operates in the manner illustrated in FIG. 3A. However, because the information of the cells "6" to "10" is not transmitted, the answer signal i is not sent back, resulting in that the input signal e is not sent out, whereupon the communication is terminated at this time point, giving rise to a serious problem.

The circuit configuration shown in FIG. 2A requires large scale hardware for applying a great amount of delay. Moreover, the delay time has to be maintained at a constant value. With the circuit configuration shown in FIG. 2B, the amount of hardware as required can be reduced with the amount of delay to be added being variable. However, because of strong correlation observed between the permissible amount of delay and the cell arrival time interval, the delay to be added will remain at a constant value when the arrival time interval between the input cells is constant, which means that the circuit configuration shown in FIG. 2B is not suited for the ATM cell delaying application in the two-way communication.

SUMMARY OF THE INVENTION

It is therefore an object of the present invention to provide a circuit for applying delay times to ATM cells by controlling the time taken for input cells to pass through a shift register by adding dummy cells to the cells inputted to a delay adding circuit.

In view of the above and other objects which will become apparent as description proceeds, there is provided according to an aspect of the invention an ATM cell delaying circuit, which comprises a dummy cell generating circuit for generating dummy cells at a controllable time interval, a first cell filter for extracting from an input signal only those cells to which delays are to be applied, a cell multiplexing circuit for synthesizing an output of the dummy cell generating circuit and an output of the cell filter, a delay adding circuit for delaying an output of the cell multiplexing circuit, and a second cell filter for eliminating the dummy cells from the output of the delay adding circuit. In case the dummy cell generating circuit 1 is arranged to generate idle cells, the second cell filter can be spared.

These and other advantages and attainments of the present invention will become apparent to those skilled in the art upon a reading of the following detailed description when taken in conjunction with the drawings.

BRIEF DESCRIPTION OF THE DRAWINGS

FIGS. 4A to 4F are timing charts for illustrating operation of the ATM cell delaying circuit shown in FIG. 1;

DESCRIPTION OF THE PREFERRED EMBODIMENTS

Now, the invention will be described in conjunction with an exemplary or preferred embodiment thereof.

Figure 1:
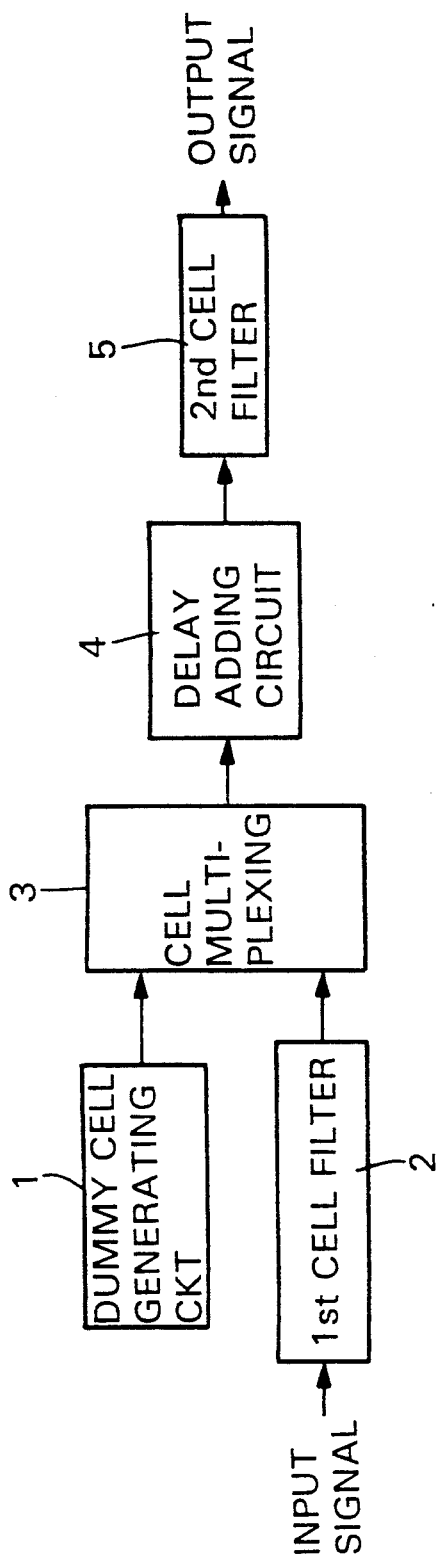
FIG. 1 is a circuit diagram showing a configuration of an ATM cell delaying circuit according to an embodiment of the present invention.

In FIG. 1 which shows a configuration of the ATM cell delaying circuit according to an embodiment of the invention, a reference numeral 1 denotes a dummy cell generating circuit, 2 denotes a first cell filter, 3 denotes a cell multiplexing circuit, 4 denotes a delay adding circuit, and 5 denotes a second cell filter. Interconnection of those constituent circuits can readily be understood from FIG. 1 without need for any further description. The dummy cell generating circuit 1 is designed to generate dummy cells at a time interval which can be controlled. The first cell filter 2 serves to extract from an input signal only those cells which are to be delayed. The cell multiplexing circuit 3 multiplexes the dummy cells and the extracted cells. The delay adding circuit 4 delays the multiplexed cells. The second cell filter 5 serves for eliminating the dummy cells from the output of the delay adding circuit 4.

Figure 7:
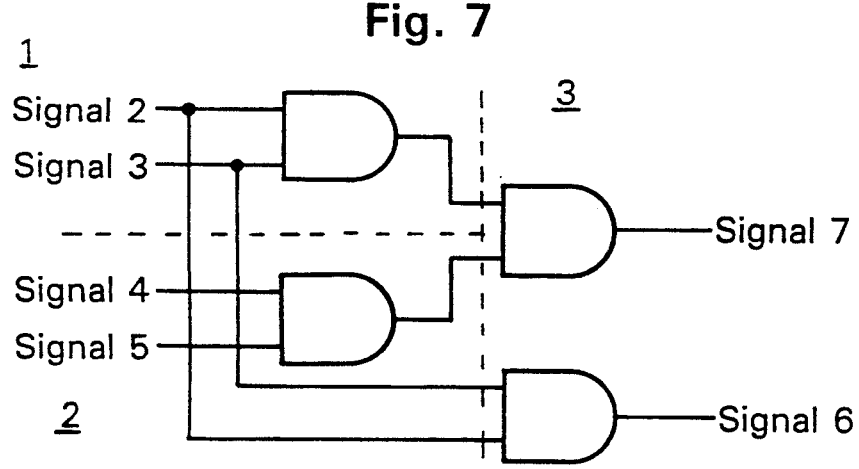
FIG. 7 is a circuit diagram showing gating, multiplexing, and delaying circuitry according to the present invention.

The dummy cell generating circuit 1 may include a cell pattern generator and a gating circuit. The cell pattern generator generates a cell pattern having repeated pulse sequences having the same cell length. Each sequence forms a cell. This cell pattern is gated by the gating circuit to obtain a dummy cell pattern to be supplied to the cell multiplexing circuit 2 (FIG. 7, portion 1). The gating signal may be generated either by a 1/r counter or a random generator. In the former, a traffic model of dummy cell sequence is obtained in which the cells are repeated at the same time intervals r. In the latter case, a random traffic model of dummy cell sequence in which the occurrence of the cells follows the probability expressed by a Bernoulli's distribution having an average value $\lambda$.

Figure 5:
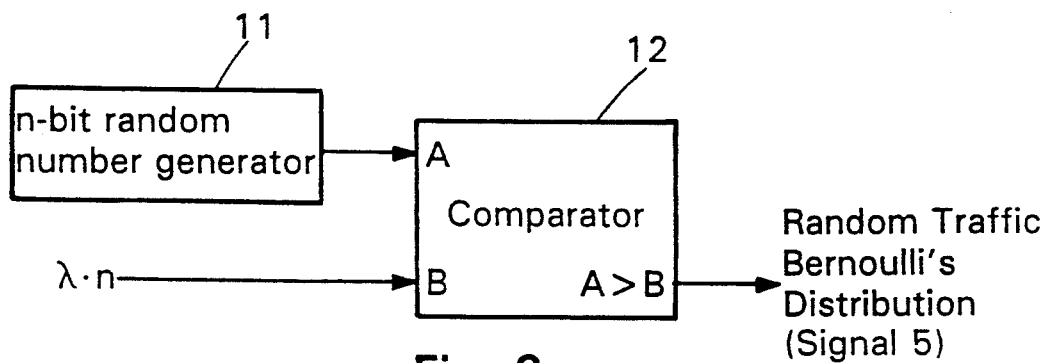
FIG. 5 is a circuit diagram showing a random generator for use in the present invention.

The latter may be realized by a circuit as shown in FIG. 5, wherein 11 is an n-bit random number generator and 12 is a comparator. The output of the generator 11 forms an input and $\lambda * n$ forms a B input of the comparator and an output is issued when $A > B$.

Figure 6:
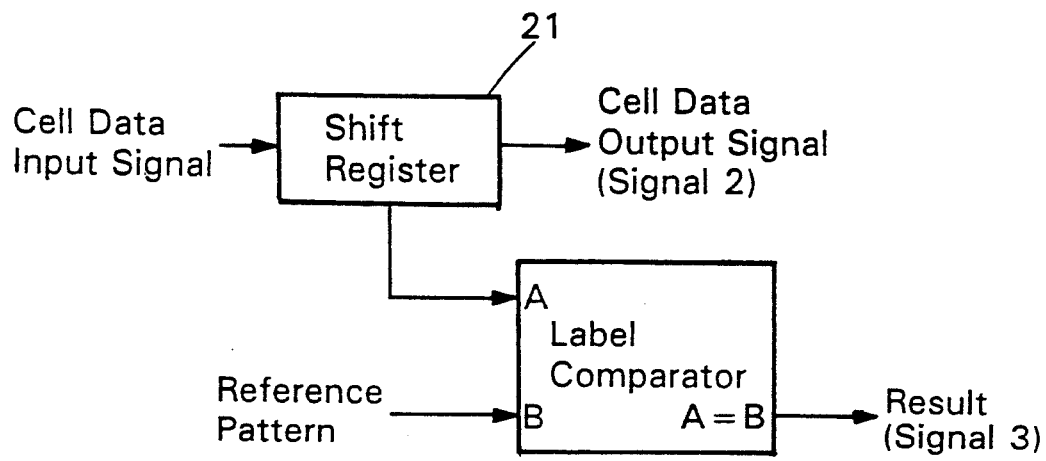
FIG. 6 is a circuit diagram showing a cell filter for extracting particular cells to be delayed according to the present invention.

The first cell filter 2 extracts particular cells to be delayed. Each of the ATM cells includes a label called "header". Accordingly, the desired cells to be delayed can be extracted by using a comparator in which the header is compared with the desired label. FIG. 6 illustrates an example of such a filter wherein the input signal is inputted to a shift register 21 and the value in the shift register 21 is compared to a comparator 22 with a reference pattern which has a header to be extracted. The coincidence output of the comparator is used to extract desired cells (FIG. 7, portion 2).

The multiplexing in the multiplexing circuit 3 is effectuated by adding the dummy cells from the dummy cell generating circuit 1 and the extracted cells from the first cell filter 2. One example of such circuit is illustrated in FIG. 7, portion 3, wherein the cells from the circuits 1 and 2 are added.

The delay is added by the delay adding circuit 4 which may simply be a shift register. The operation will be explained in the following with reference to FIG. 4.

The dummy cells are removed by the second cell filter 5. This can be accomplished through the use of a circuit similar to the first cell filter 1. In practice, this can be done by replacing the dummy cells with idle cells during zero period of the coincidence output of the comparator in the second cell filter. Idle cells are required for transmission.

Figure 8:
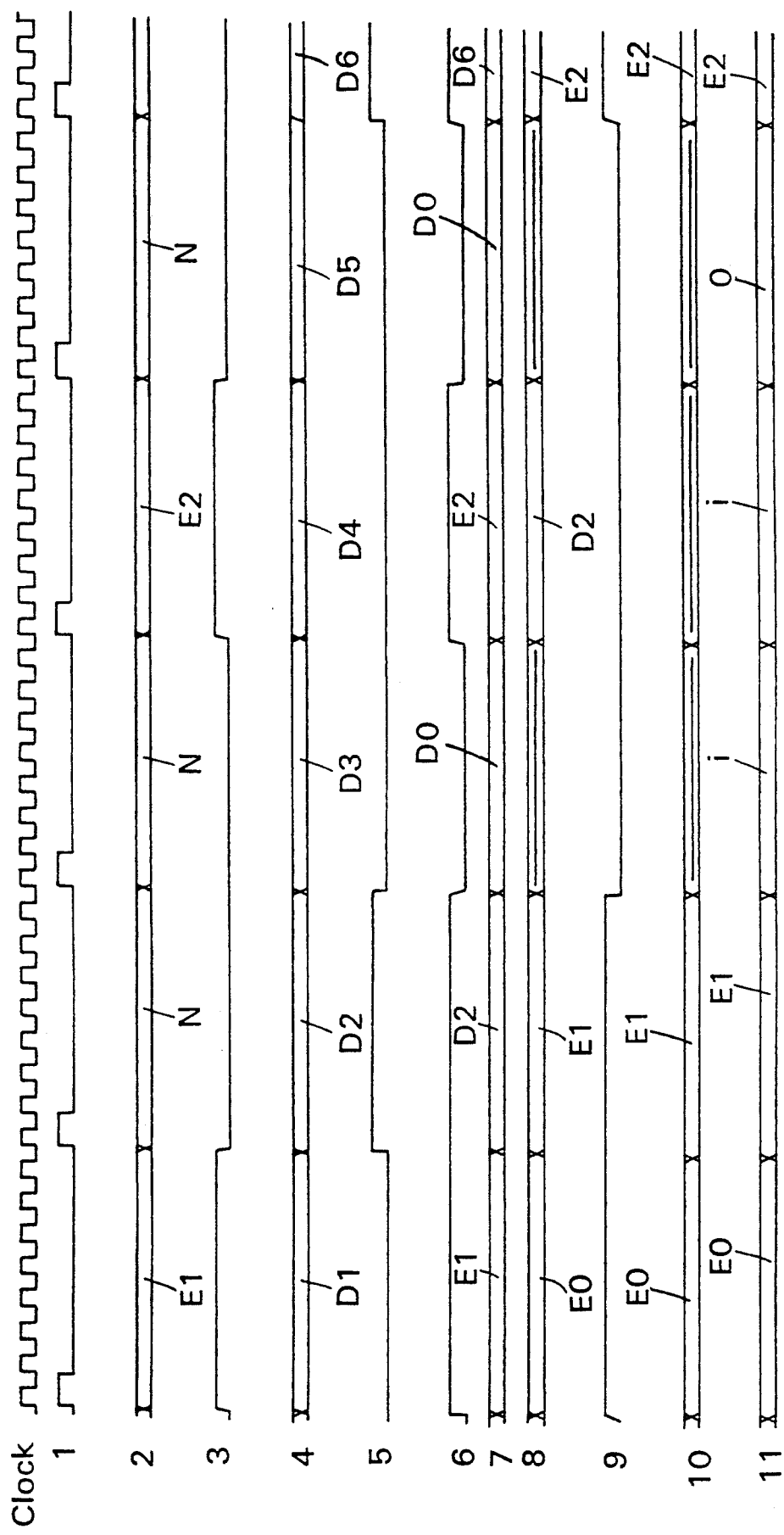
FIG. 8 is a timing diagram for illustrating the signals present in the AMT cell delaying circuitry.

FIG. 8 shows timing charts of these circuits and the signals 1 to 11 denote the following. It should be noted that signal 11 includes idle cells which have no bearing on the invention but are necessary for the subsequent step. It should also be noted for simplification that the cell length is 8 bits and the delay time in the second filter is neglected.

Signal 1: cell frame pulses for indicating cell margin.

Signal 2: Input signal to the first cell filter 2 wherein Ens (E1, E2, ... ) are cells to be delayed and Ns are the other cells.

Signal 3: Signal indicating the result of judgment as to the presence of cell Ens performed by the first cell filter in FIG. 6. The value "1" denotes that the cell is judged to be En.

Signal 4: Cells which may have any pattern if the cells can be judged to be dummy by the second cell filter 5.

Signal 5: Signal indicating gate signal for the cells derived from the signal 4 at regular intervals r or at random intervals as shown in FIG. 5 in the dummy cell generator 1 and inputted to the cell multiplexing circuit 3.

Signal 6: Gate signal for gating the cells to the delay adding circuit 4. This signal is a logical sum of the signals 3 and 5. This signal is generated by the multiplexing circuit 3 as shown in FIG. 7.

Signal 7: Multiplexed cell sequence which is a sum of the input signal cells (Ens) to be delayed and the gated dummy cells. The circuit shown in FIG. 7 perform this function.

Signal 8: Output signal from the delay adding circuit 4.

Signal 9: Signal indicating the result of judgment on the existence of Ens performed by the second cell filter 5.

Signal 10: Cells Ens extracted from the signal 8.

Signal 11: Cells in the signal 10 to which idle cells i (or other significant cells) are added between the cell Ens. This signal is finally supplied to the transmission line to be tested.

Operation of the ATM delaying circuit shown in FIG. 1 will be described by reference to timing charts shown in FIGS. 4A to 4F. As described above, the first cell filter 2 extracts from the input signal only the cells which are to be delayed. An example of cell sequence as extracted is shown in FIG. 4A, while a sequence of dummy cells generated by the dummy cell generating circuit 1 is shown in FIG. 4B, by way of example. These dummy cells can be generated at an arbitrary time interval. The cells outputted from the first cell filter 2 are synthesized with the dummy cells outputted from the dummy cell generating circuit 1 by the cell multiplexing circuit 3, the output cell sequence of which is shown in FIG. 4C.

The delay adding circuit 4 applies a delay to the output of the cell multiplexing circuit. To this end, the delay adding circuit 4 may easily be implemented by using a shift register. In that case, it is desirable to set an amount of delay. By way of example, when the amount of delay corresponding to four cells is set in the delay adding circuit 4, the input cell signal "1" shown in FIG. 4C is outputted when the cell signal "c" is inputted after three cells "2", "3" and "b" have been inputted in succession to the cell "1". FIG. 4D shows the output signal of the delay adding circuit 4 on the assumption that the delay of an amount corresponding to four cells is applied or added. The second cell filter 5 eliminates the dummy cells from the output of the delay adding circuit 4 to derive the output cell signal. When the dummy cells are removed by the second cell filter 5 from the output of the delay adding circuit 4, the output shown in FIG. 4 is obtained. Also, if FIG.4B is assumed to represent the cell input to be delayed and FIG. 4A is assumed to represent dummy cells, then the output as shown in FIG. 4F is obtained, wherein the output in FIG. 4F comprises the cell input (of FIG. 4B) at equal intervals as delayed by different delay times represented the dummy cells (of FIG. 4A).

It is noted that the delay time and length for each cell is different as indicated by $t_a$, $t_b$, $t_c$, ... in FIG. 4F.

According to the present invention, there can be obtained advantageous effects mentioned below.

(a) Since only the requisite cells are delayed by using the first cell filter, hardware resource of the cell delaying circuit can effectively be made use of and a large amount of delay can be applied to the cell.

Figure 2A:
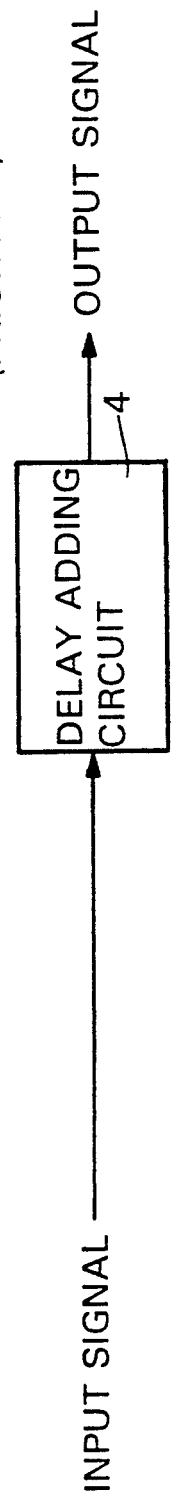
FIGS. 2A and 2B are schematic circuit diagrams showing, respectively, typical ATM cell delaying circuits known heretofore.
Figure 2B:
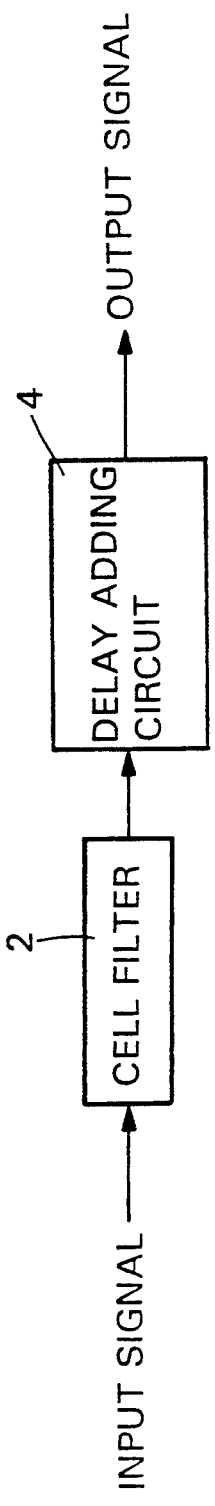
Figure 3A:
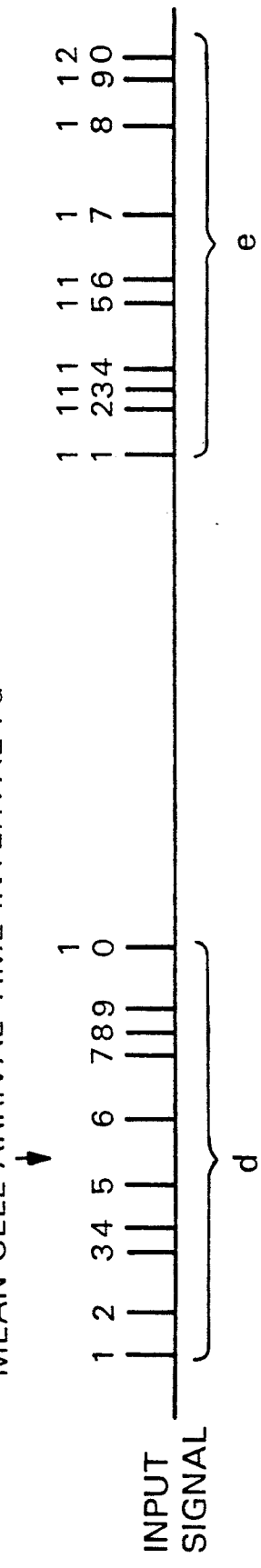
FIGS. 3A to 3C are timing charts for illustrating operations of the ATM cell delaying circuits shown in FIG. 2B.
Figure 3B:
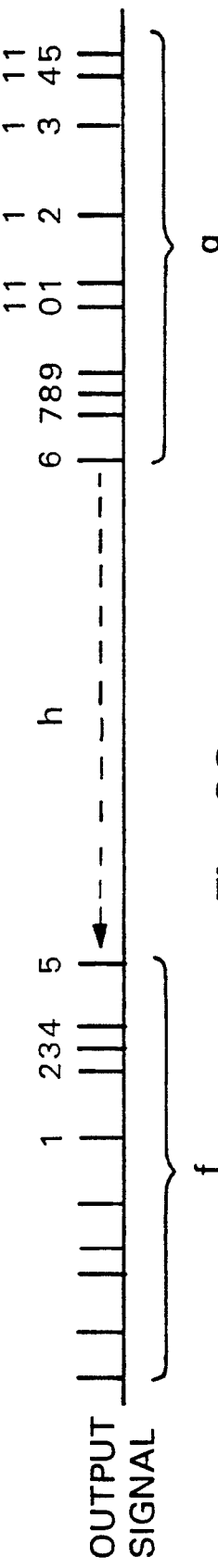
Figure 3C:
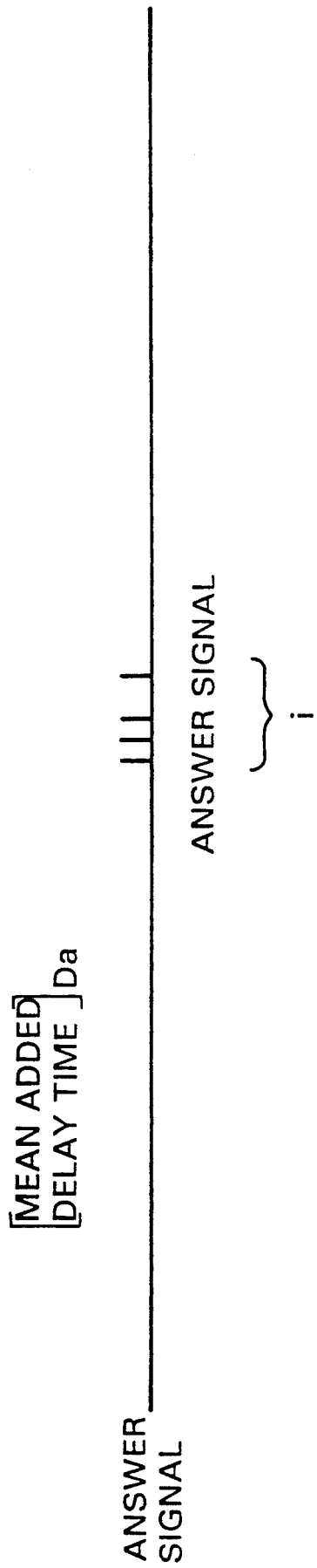

(b) The cells inputted at a constant time interval can undergo delays of different amounts. By way of example, let's assume that the cells shown in FIG. 4B represent those extracted from the signal to be delayed. In the case of the prior art circuit shown in FIG. 2B, the cells undergone the delay are outputted at a same time interval as that of the cells of the input signal. In contrast, in the case of the ATM cell delay circuit according to the invention, the cells inputted at a constant time interval as shown in FIG. 4B can be outputted as the cells undergone different amounts of delays as shown in FIG. 4F by using the cells shown in FIG. 4A as the dummy cells. When the time interval of the dummy cells is selected to be of a constant length greater than the period of the input cell signal, the maximum delay amount can be varied within a limit shorter than the time interval of the input cells. When the time interval of the dummy cells is selected to be a constant value shorter than the period of the input cell signal, the maximum delay variance width can be changed within the time corresponding to the time interval of the dummy cells. In case the burst cells are used as the dummy cells, the maximum delay variance can be realized within a range corresponding to an integral multiple of the period of the input cell signal. In this manner, the amount of delay to be applied to the cell can be changed by controlling correspondingly the time interval at which the dummy cells are generated.

(c) In the case of the two-way communication, even the last cell of one communication is transferred by the dummy cell regardless of the answer signal, whereby the delay addition can be effected without bringing about termination of communication.

Since numerous modifications and changes will readily occur to those skilled in the art, it is not desired to limit the invention to the exact construction and operation illustrated and described, and accordingly, all suitable modifications and equivalents may be resorted to within the scope of the invention. In an alternate embodiment of the present invention, for example, the dummy cell generating circuit 1 is arranged to generate idle cells. In the alternate embodiment, the second cell filter 5 is omitted. As is well known, ATM cells appear at equal intervals to synchronize the receiver so as to achieve high speed reception. Idle cells must be inserted to maintain the periodicity of the cell stream.

I claim:

1. An Asynchronous Transfer Mode (ATM) cell delay circuit for correcting variations in propagation delay in an Integrated Services Digital Network (ISDN), the circuit comprising:

a dummy cell generating circuit for generating an output of dummy cells at a controllable time interval;

a first cell filter for extracting from an input signal an output of only those cells to which delays are to be applied;

a cell multiplexing circuit for synthesizing the output of said dummy cell generating circuit and the output of said first cell filter and producing an output of said cell multiplexing circuit;

a delay adding circuit for delaying the output of said cell multiplexing circuit and producing an output of said delay adding circuit; and a second cell filter for eliminating said dummy cells from the output of said delay adding circuit.

2. An Asynchronous Transfer Mode (ATM) cell delay circuit for correcting variations in propagation delay in an Integrated Services Digital Network (ISDN), the circuit comprising:

an idle cell generating circuit for generating an output of idle cells;

a cell filter for extracting from an input signal an output of only those cells which are to be delayed;

a cell multiplexing circuit for synthesizing the output of said idle cell generating circuit and the output of said cell filter and producing an output of said cell multiplexing circuit; and a delay adding circuit for delaying the output of said cell multiplexing circuit.

* * * * *